United States Patent [19]

Dougherty et al.

[11] 4,188,631
[45] Feb. 12, 1980

[54] LINKAGE APPARATUS FOR SYNCHRONIZING AIRCRAFT DOOR MOVEMENTS WITH THE DEPLOYMENT OF A DOOR-ENCLOSED ANTENNA

[75] Inventors: Richard H. Dougherty, Tarzana; Thomas E. Fealy, Burbank, both of Calif.

[73] Assignee: The United States of America as represented by the Secretary of the Navy, Washington, D.C.

[21] Appl. No.: 915,345

[22] Filed: Jun. 13, 1978

[51] Int. Cl.$^2$ .............................................. H01Q 1/28
[52] U.S. Cl. ...................................... 343/705; 343/872
[58] Field of Search ................... 343/705, 872; 244/57, 244/58, 118 R, 102, 129.5, 129.6; 89/37.5 D, 38

[56] References Cited

U.S. PATENT DOCUMENTS

| 2,406,710 | 8/1946 | Riggles et al. | 244/102 R |
|---|---|---|---|
| 2,951,454 | 9/1960 | Candlin | 244/129.6 |
| 3,656,164 | 4/1972 | Rempt | 343/705 |
| 4,014,486 | 3/1977 | Nelson et al. | 244/129.6 |

FOREIGN PATENT DOCUMENTS

| 654189 | 12/1962 | Canada | 343/705 |
|---|---|---|---|
| 603203 | 6/1948 | United Kingdom | 244/129.5 |

*Primary Examiner*—Eli Lieberman
*Attorney, Agent, or Firm*—Richard S. Sciascia; Paul N. Critchlow

[57] ABSTRACT

An extendable infra-red antenna is carried in a bay portion of the aircraft normally closed by laterally-swinging, clam-shell doors. Separate, unconnected linkage assemblies driven by a common crank extend and retract both the doors and the antenna. When retracted, the antenna linkage is driven into an overcenter disposition but the door linkage is not. As a result, the doors begin to open before the antenna begins to deploy. Conversely, when the antenna is fully extended, its linkage is not overcenter but the door linkage is. The antenna then begins to retract before the doors begin to close. The overcenter relationships cause one member to first move in a direction opposite to that of the other so as to insure against any interference between the moving members. Stop means are provided to permit the antenna to be firmly secured in both its extended and retracted disposition.

9 Claims, 5 Drawing Figures

LINKAGE APPARATUS FOR SYNCHRONIZING AIRCRAFT DOOR MOVEMENTS WITH THE DEPLOYMENT OF A DOOR-ENCLOSED ANTENNA

BACKGROUND OF THE INVENTION

The present invention relates to overcenter linkage arrangements and, in particular, to systems for synchronizing door movements with extension movements of equipment contained within the doors.

Overcenter linkage arrangements commonly are used for a variety of purposes dictated usually by the requirements of the situation in which they are used. The present arrangement principally is adapted for aircraft use although other uses also are contemplated. In particular, its function is to extend and retract a large infra-red detector system (IRDS) normally contained or stored in a bay portion of the aircraft behind a pair of clam-shell doors. Conventionally, the IRDS antenna is carried in a fixed, extended and unretractable position. However, for aerodynamic as well as protective reasons, the unretractable arrangements are not too desirable. A preferable arrangement is to provide a protective storage in which the antenna is not exposed to the elements and to possible damage during flight. On the other hand, if the antenna is to be stored, it obviously must be extended for use.

Attempts to provide suitable extension and retraction systems, for one or another reasons, have not been found acceptable. One of the difficulties is that, from an IRDS performance standpoint, it is important that the antenna be held in a firmly secured, stable disposition particularly when extended. Conventional linkage systems permit too much vibration or other movements. However, structural designs also must recognize that aircraft space and weight are at a premium and that strength and stability consequently must be provided in a relatively small and compact manner. Space further dictates a close fit of the antenna and its linkage into the storage area as well as a close fit between the antenna itself and the doors which protectively enclose it. Special care consequently must be taken to assure that the opening and closing movements of the doors do not interfere with the extension and the retraction of the antenna or, in other words, that these movements all are closely and reliably synchronized.

It is known that somewhat comparable circumstances exist in other arrangements. For example, U.S. Pat. Nos. 2,531,263 and 4,014,486, as well as others, disclose systems utilizing overcenter or 'lost motion' to synchronize an extension of a loading stairway with the opening of doors behind which the stairway is stored. These prior arrangements, however, are not presently acceptable or, in fact, even adaptable for present purposes. For one reason, their stairways pivot on an axis that is parallel to the pivotal axis of the door so that both members swing outwardly about parallel axes. The present problem is quite different in that the doors swing on an axis that preferably is at a right angle to the pivotal axis of the antenna. Consequently, separate independent linkage assemblies are needed one for the doors and the other for the antenna. Synchronization of such separate and independent assemblies presents a complication both in the retraction as well as the extension movements.

The objects of the present invention should be readily perceivable from the foregoing description. In general, they are achieved by employing, as indicated, separate and independent linkage assemblies for both the antenna and the doors. The linkage assemblies are driven by a common crank shaft which, in turn, is rotatably driven by a rotary actuator. The arrangement is such that the linkage assembly for the doors is driven overcenter when the doors are moved to their fully open position, while the linkage assembly for the antenna is moved overcenter when the antenna is in its fully retracted position. The overcenter disposition of the antenna delays its extension until the doors have partially opened. Also, the overcenter disposition of the doors delays closing until the antenna has been partially retracted. Interference between the two moving objects consequently is effectively eliminated. As another preferred feature, the antenna is locked in a stable position in both its extended and retracted positions. Again, it may be advisable to note that there is no intention to limit the present invention to IRDS systems or, in fact, to the deployment of any particular object whether carried by an aircraft or by some other means.

BRIEF DESCRIPTION OF THE DRAWINGS

The present invention is illustrated in the accompanying drawings of which.

DETAILED DESCRIPTION OF THE INVENTION

Figure 1:
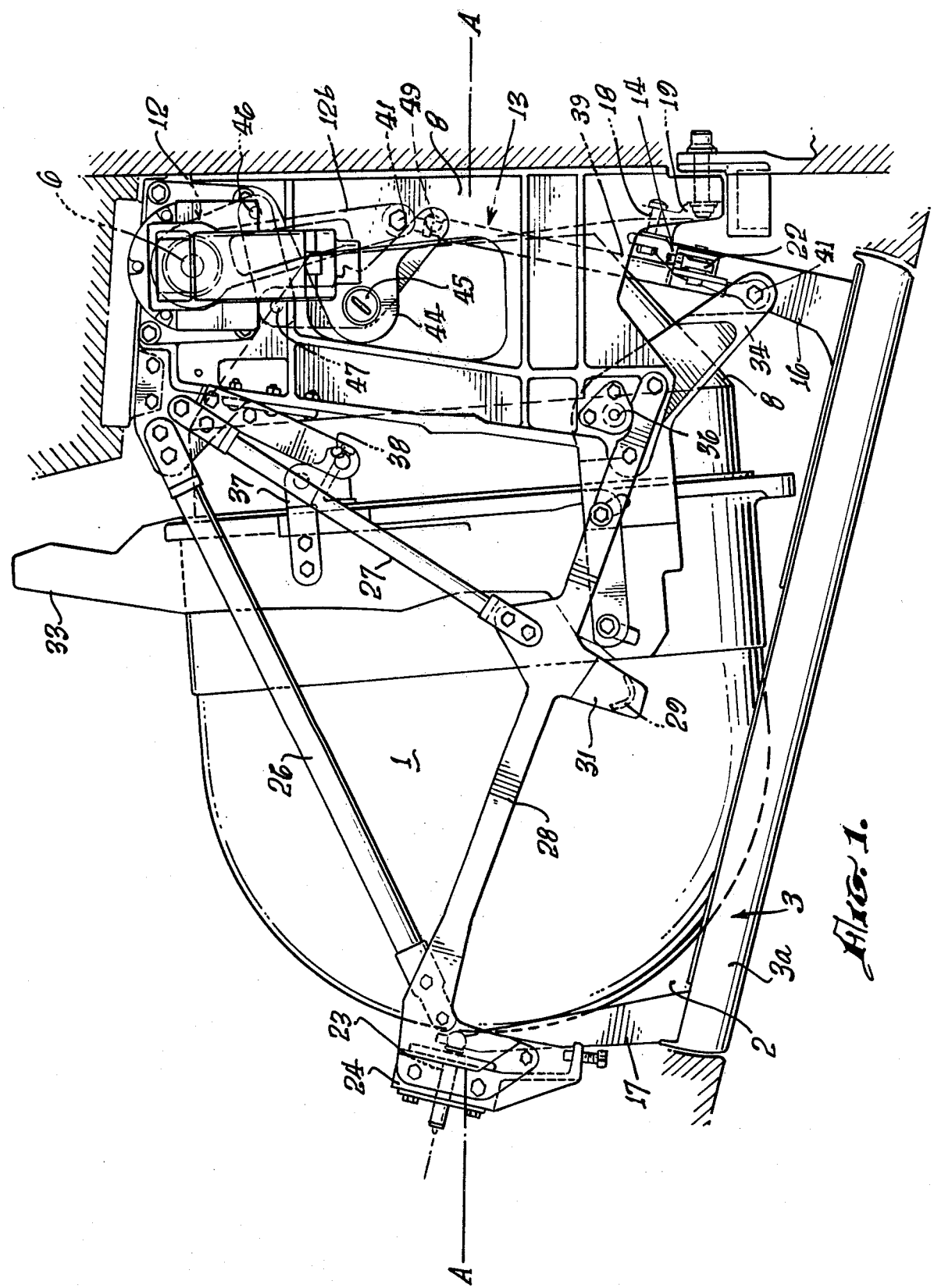
FIG. 1 is a side elevation of the present apparatus showing the antenna in its retracted disposition.

Before considering specific structural details, it may be helpful to describe the intended operation of the so-called IRDS system. In these systems an infra-red antenna, such as antenna 1, is carried in a bay portion of the aircraft provided on the bottom surface and toward the rear of the radome structure which forms the nose portion of the craft. In FIG. 1 the bay portion or storage area is identified by numeral 2. As seen, it normally is closed by a pair of clam-shell doors 3. The term clam-shell doors designates a door assembly formed of a pair of curved, half-shell members 3a and 3b (FIG. 2) which meet at a center line to mutually form the enclosure. They open in pivotally swinging motion one away from the other. The antenna is shown in FIG. 1 in its retracted position with the doors in their closed disposition. To orient the arrangement relative to the aircraft the fore and aft line of the aircraft or, in other words, its longitudinal axis is shown in FIG. 1 as an A—A line. With reference to this line, doors 3a and 3b open by swinging laterally of the aircraft about a longitudinal horizontal axis. Antenna 1, on the other hand, swings downwardly about a transverse axis of the aircraft. The doors and the antenna thus are pivoting on axes which are normal one to the other. Another consideration is that, as shown in the drawings, the entire arrangement is closely fitted into a relatively small storage area with little tolerance provided between the moving parts.

Further, as will be appreciated, the antenna itself must be serviced by a number of electrical connections (not shown) which themselves occupy a significant amount of the valuable space. These particular problems involving the different rotational axes and the small storage space have been matters of particular concern.

Figure 2:
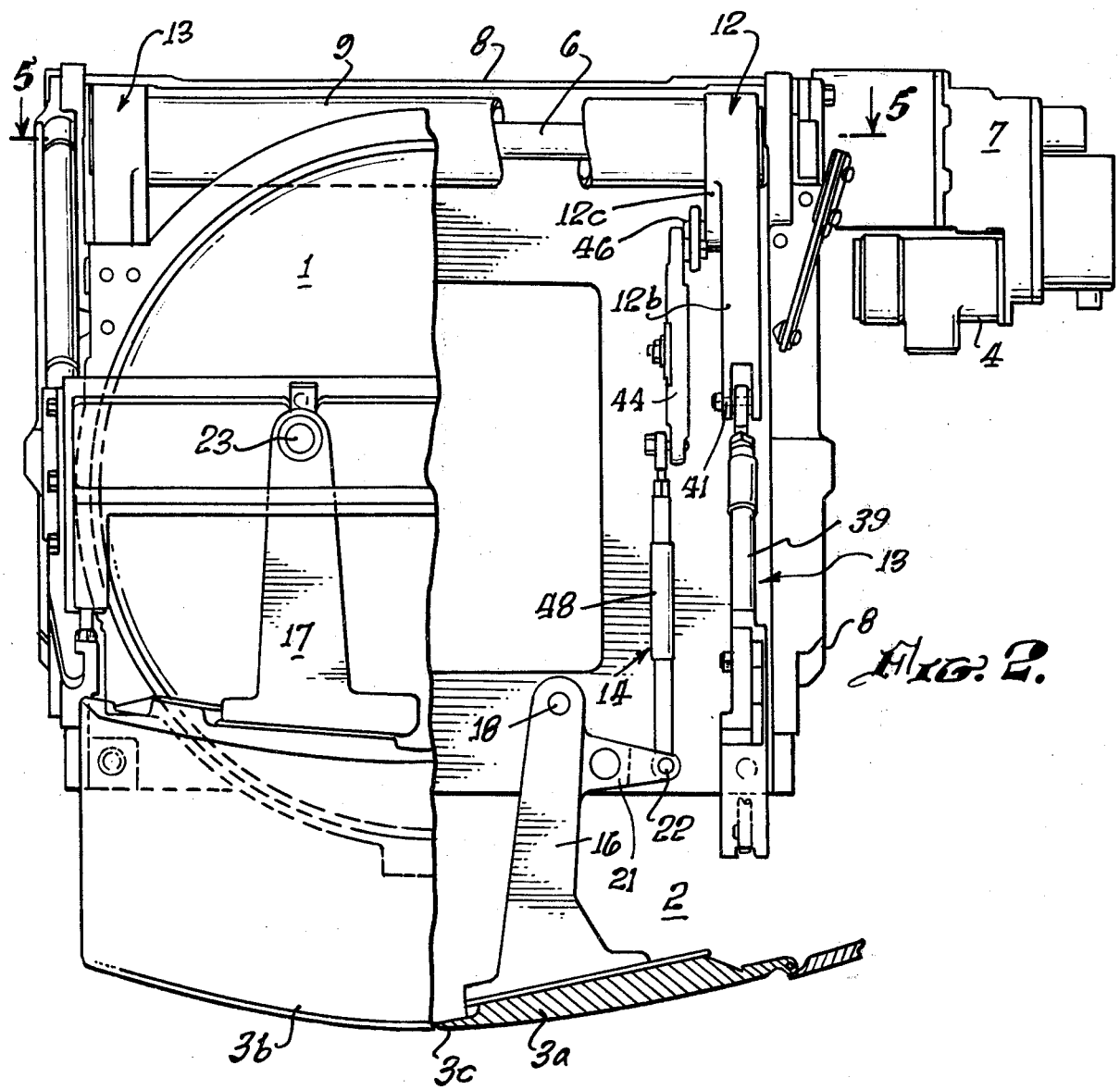
FIG. 2 is a front elevation viewed from the left of FIG. 1 with a portion of the apparatus shown partly in section.
Figure 3:
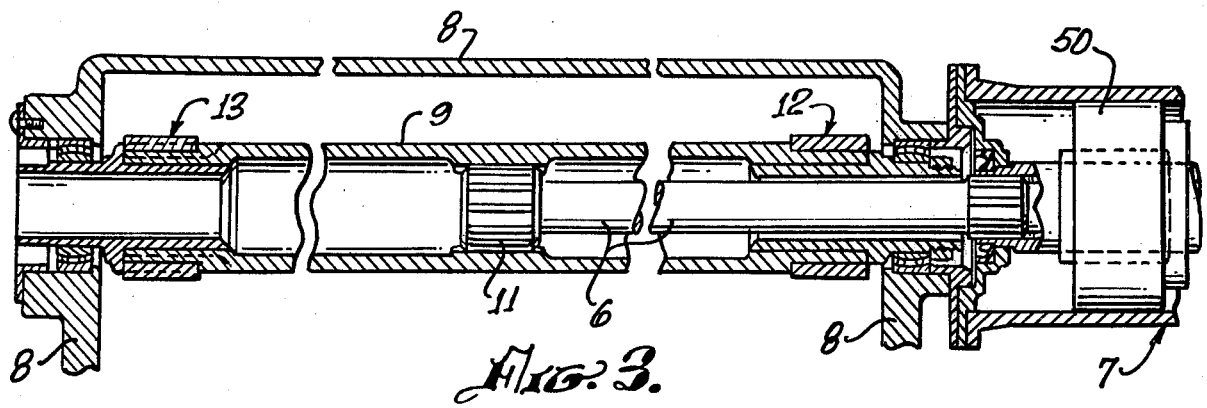
FIG. 3 is a view taken along lines 3—3 of FIG. 2.

Specifically considering the illustrated structure, driving power for the door and antenna linkage arrangements is provided, as shown in FIG. 2, by a motor 4 having an elongate drive shaft 6 rotatably driven through gear box 7 in one direction or the other. Support for these members is provided by the aircraft frame itself which, in further description, will be identified by numeral 8. As shown in FIG. 3, drive shaft is run through a torque tube 9 which it drives through a splined connection 11 (FIG. 3). A roller bearing arrangement supports tube 9 and a pair of crank arms 12 and 13 splined to torque tube 9 (FIG. 3) pivotally respond to the tube rotations. The use of the pair of crank arms 12 and 13 is to provide a drive for each of clam-shell door halves 3a and 3b and also to provide a pair of linkage assemblies for the rather sizable antenna itself. However, since the linkages for both of the doors are identical, a description of one can serve for both. The same applies to the pair of linkages for the antenna.

One feature of the present configuration is that of using a single crank shaft 12 to drive both the doors and the antenna. Common crank shaft 12 is coupled to the door linkage and also to the antenna linkage and, for this purpose, it is formed with two integral lever arms 12b and 12c with the longer arm 12b being coupled to the actuating linkage for the antenna and the shorter arm 12c coupled to the linkage for the door. The actual structure of the linkages will be described subsequently. For present purposes, they generally can be identified as an antenna linkage assembly 13 and door linkage assembly 14. Except for the use of common drive shaft 12, the linkage assemblies are entirely separate and independent. Each linkage assembly, as will be noted, constitutes, by definition, the series of articulated links and other members coupled between the end of each lever arm 12b and 12c and the doors or the antenna which they control.

With regard to the physical structure of door assembly 3 and the manner in which these doors are opened and closed, it already has been noted that a clam-shell arrangement of door halves 3a and 3b is used. In FIG. 2 (left hand side) the forward exterior side of door 3b is shown in elevation with door 3a shown in section. Both halves, of course, when closed, meet at a common central point 3c and, if desired, can be overlapped. In opening, both of the halves swing upwardly into aircraft bay portion 2. To achieve this upward and inward motion, each door member 3a and 3b is carried by a pair of hinge arms 16 and 17 with arm 16 being driven by its linkage assembly 14 and arm 17 primarily being a support member that is hinged to follow the motion produced by assembly 14. Hinge arm 16 is carried on a hinge pin 18 which, in turn, is carried by a bracket 19 bolted to the aircraft frame (FIG. 1). To swing hinge arm 16 upwardly and inwardly, the arm carries a flange 21 bifurcated at its outer end to receive a connecting pin 22 to which the lower end of linkage assembly 14 is connected. An upward movement of linkage 14 pivots hinge arm 16 on its pivot pin and causes the doors to open.

Figure 5:
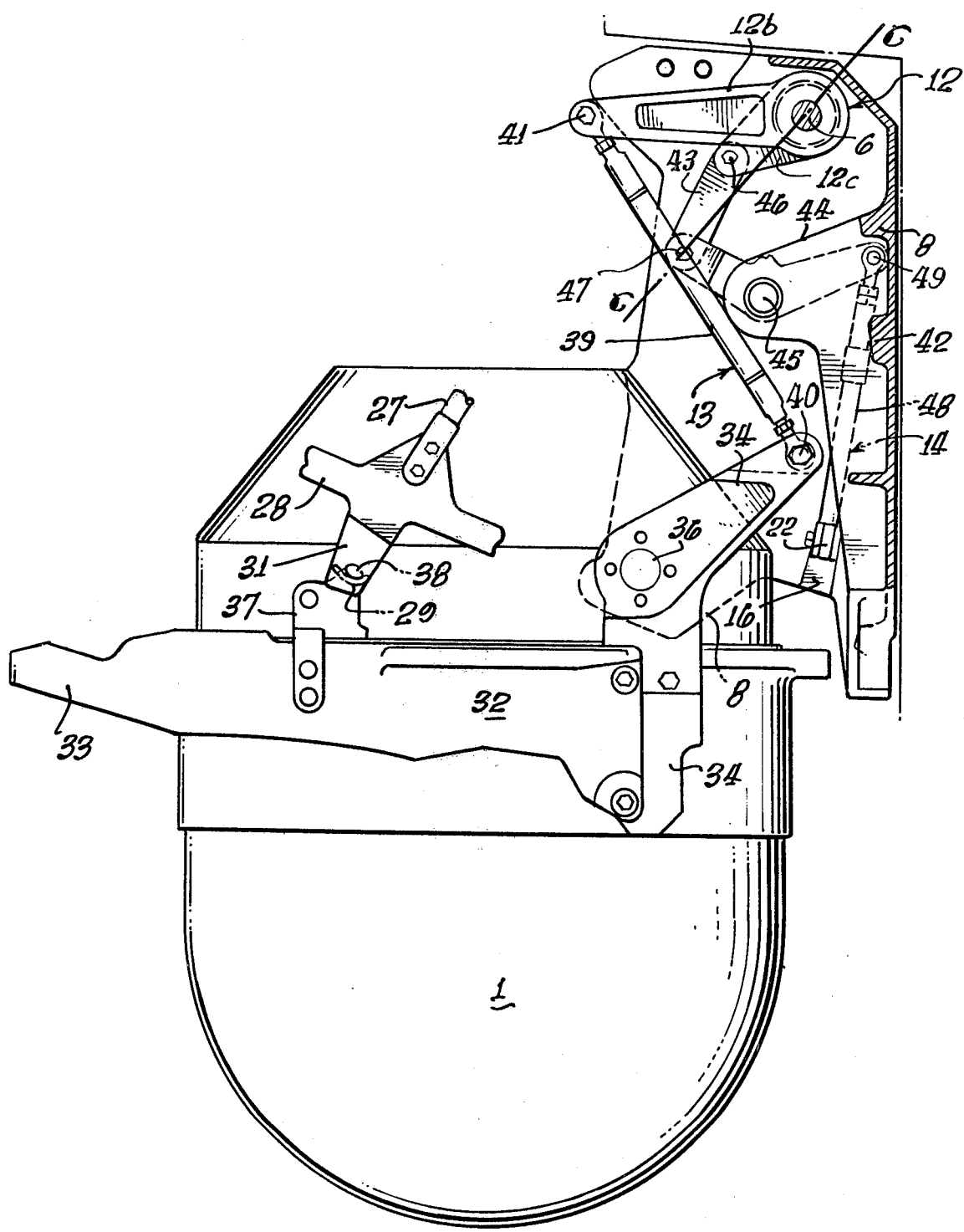
FIG. 5 is a view similar to FIG. 4 showing the antenna and the linkages in a fully extended disposition.

Hinge arm 17, in turn, is carried on a hinge pin 23 as shown in FIG. 1. A pin-carrying bracket 24 itself is supported by a fixed framework including rigid extension members 26 and 27 both of which are bolted at their upper ends to aircraft supporting structure 8. A fixed fore and aft member 28 also is supported by the structure at its rearward end. The primary function of the fixed framework is to support the front end of the doors. Also, horizontal member 28 provides a down stop cradle 29 formed in a flange 31, which provides a stop or abutment for antenna 1 when it is moved downwardly into its fully extended position (FIG. 5). Obviously, FIG. 1 shows only the supporting members and hinges for only one of the doors. The opposite side of the arrangement includes identical supporting structure for door 3b.

Linkage assemblies 13 and 14 best are explained with reference to FIGS. 4 and 5 which, respectively, are retracted and extended positions of antenna 1. Antenna 1 which, as seen, is a somewhat hemispherical structure adapted, when extended, to provide wide-angle infrared detection. The globe-like structure is aerodynamically advantageous but, of course, other antenna shapes and sizes are possible. At its rear portion the antenna carries a yoke-like member 32, preferably, extending upwardly along each side of the antenna and over its top portion. Upward extension 33 is formed to match corresponding curvatures in aircraft bay or storage areas. Antenna linkage assembly 13 is secured to and provides the drive for yoke 32 and the antenna. For this purpose, the linkage assembly includes a rocker arm 34 pivotally mounted on a pin 36 carried by aircraft frame 8. The rocking movement of arm 34 carries antenna 3 from its retracted to its extended position and vice versa (cf FIGS. 4 and 5). When fully extended, it is engaged by previously-mentioned stop 29. For this purpose, support yoke 32 carries a bracket 37 having a laterally-extending rod or flange 38 received in stop 29.

To pivot rocker arm 34, it is coupled by pin 40 at its rearward end to an elongate, rod-like link 39 the upper end of which is pivotally carried on a pin 41 carried by long lever arm 12b of the crank shaft. As should be noted when the antenna is retracted (FIG. 4), lever arm 12b is forced into engagement with a stop flange 42 (FIG. 4) formed on aircraft frame structure 8. Thus, at both ends of its travel, antenna 1 is engaged by stop members 42 and 29, which, in a manner to be described, permit the position of the antenna to be stabilized or, in other words, secured against vibrational movements or other forces which might damage the antenna or affect its performance.

Door linkage assembly 14 is similar to antenna assembly 13 in that it also includes a short link 43 pivotally coupled at one end to short lever arm 12c of the common crank arm and at its other end to a rocker arm 44 carried by the aircraft frame on a pin 45. Pin 46 couples the short lever arm to the link and pin 47 couples the link to the rocker arm. Rocker arm 44, in turn, is coupled by a pin 49 to an elongate rod-like link 48 which, as previously described, is connected by pin 22 to flange 21 of door-carrying hinge arm 16.

Figure 4:
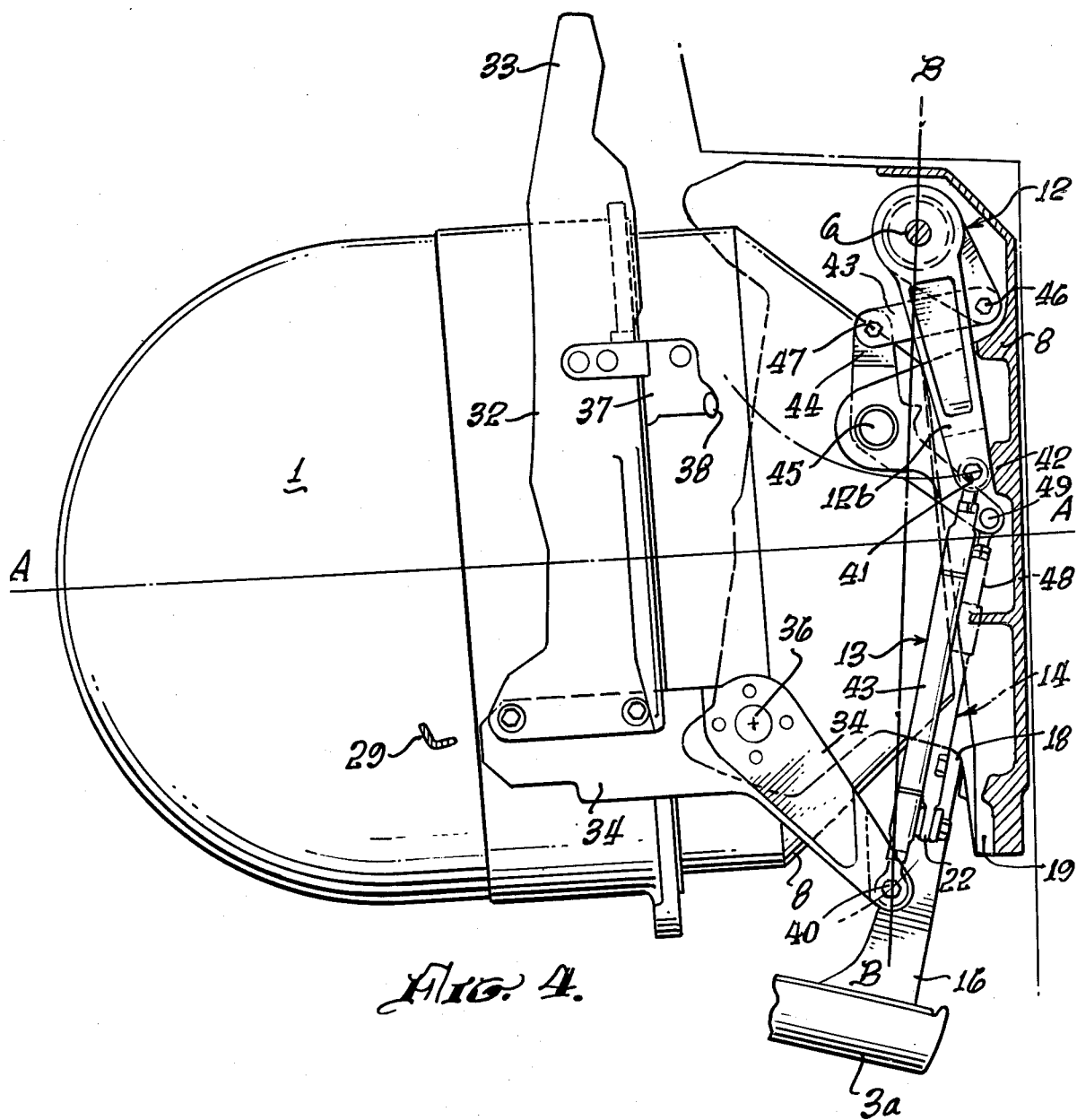
FIG. 4 is a view somewhat similar to FIG. 1 with a large part of the supporting structure eliminated to show more clearly details of the linkage assemblies in their fully retracted disposition.

Operationally, when motor driven shaft 6 is rotated clockwise from its FIG. 4 to its FIG. 5 position, crank 12 rotates arcuately to articulate door linkage assembly 14. Rocker arm 44 rotates on its fixed pin 45 to exert in an upward force on rod 48 and cause hinge arm 16 to swingably open door assembly 3, the doors moving as already noted upwardly into the storage bay. Concurrently, clockwise rotational movement of long lever arm 12b carries the upper end of linking rod 39 to its FIG. 5 position, this movement rotating rocker arm 34 about its fixed pin 36 to lower the antenna into its FIG. 5 disposition. Counter clockwise movement of the crank shaft and its lever arms, of course, reverses these actions to close the doors and retract the antenna into the FIG. 4 disposition.

One of the features of the present invention is the manner in which the door movements and the deployment movements of the antenna are synchronized to avoid interference or, in other words, to assure that the doors begin to open before the antenna is extended and, conversely, to assure that the antenna begins to retract before the doors begin to close. Because of the close tolerances and compactness of the arrangement, this synchronization is quite important. In general, it is accomplished by employing overcenter linkage principles both for the door linkage and the antenna linkage. More specifically, as will be noted in FIG. 4, when antenna 1 is fully retracted its linkage assembly 13 is driven overcenter of a center line B—B extending between the center of motor drive shaft 6 and the center of pin 40. However, in contrast to this overcenter disposition, door linkage assembly 14 is not then overcenter. As a result, the clockwise rotation of the crank arm is transmitted immediately to the door linkage assembly but, due to the overcenter disposition of the antenna linkage assembly, the downward extension of the antenna is delayed. Specifically, antenna 3 does not move downwardly until connecting pin 41 travels clockwise beyond center line B—B. In fact, as will be apparent, the first movement of the antenna will be in a clockwise direction, i.e. further into its storage area. Thus, the doors are moved out of the way before the antenna starts its downward movement. It also is to be noted that, when the antenna is retractably moved back into its storage bay, its crank arm 12b travels across centerline B—B. At this point, rocker arm 34 has moved the antenna clockwise as far as it will go. Continued counter clockwise movement then causes crank arm 12b to move to its overcenter position, and, during this movement, the antenna backs off a little or, in other words, moves back from its maximum inward travel disposition. Even so, when the antenna comes to its rest or stored and backed-off position within the bay, this backed off position is nevertheless stabilized since lever arm 12b then is pressed into contact with previously-identified stop 42 (FIG. 4).

A similar but reversed overcenter arrangement is utilized for synchronizing the closing movements of the doors with a retraction of the antenna. Thus, as shown in FIG. 5, when the antenna is fully extended and the doors fully opened, door linkage assembly 14 is moved to an overcenter disposition or, in other words, its connecting pin 46 is moved overcenter of line C—C extending between the center of drive shaft 6 and rocker arm pin 47. However, in this fully extended position linkage assembly 13 for the antenna is not overcenter. The result, again, is that counter clockwise drive immediately starts the retraction of antenna 1 but the doors do not begin to close till pin 46 has reached centerline B—B. The end result is that each linkage assembly 13 and 14 is driven into a overcenter position in one but not the other of its rotational movements. The overcenter positions are such that one member, such as the antenna, does not begin its motion until the other member has moved a certain distance and vice versa. This sychronization reliably and quite simply avoids interference between these two moving members.

A further feature of the invention is the manner in which the antenna is stabilized both in its extended and its retracted disposition. As has been noted, at its fully extended position, it engages stop 29 and at its fully retracted position its linkage assembly engages stop 42. However, even though these positions are supported by the stops, there is a need to lock the antenna in each of these positions so that a firm contact between the stops is as securely maintained. For this purpose, motor 4 is used to continue the rotational drive of its shaft and its torque tube beyond the point needed to move the antenna into contact with its stops 29 and 42. The continued drive produces a certain amount of torque force in the shaft and its tube and this force is applied to the engagement of the antenna with its stop to securely hold the engagement against disrupting forces. When the motor drive has exerted sufficient force, a clutch mechanism 50 (FIG. 3) engages and locks the shaft in its tensioned state. Mechanism 50 can be built into the gear box as indicated in the drawings. As such it would be activated electrically and automatically at a certain point in the rotational drive of the shaft and it would be manually released. Obviously, other mechanisms such as a solenoid-type latch or clamp can be used and applied to the shaft or its tube in any desired manner.

In general, the present linkage system provides a relatively simple, compact arrangement for synchronizing the door and antenna movements about their separate axes which, as noted, are normal one to the other. It is particularly advantageous for use in situations comparable to that of the described IRDS deployment which involves a large antenna structure normally stored in a small space which is almost fully occupied by the antenna itself. The compactness and space requirements of the linkage then becomes a significant concern. As seen in FIG. 4, the present arrangement successfully achieves this end. Another particular advantage lies in the use of the common crank arm for both the door and the antenna linkage with the common arm being driven by a single motor and drive shaft. This arrangement readily lends itself to the paired linkages or, in other words, the identical pair of linkage systems for each half of the clam-shell doors as well as the pair of linkages for the large antenna. Also, the use of the long and short lever arms formed integrally on the common drive shaft is as significant factor in that the length of each lever arm can be tailored to provide rotational arcs of different radii which, in turn, tend to control the relative rate of travel of the linkage assemblies and their driven members, i.e. the doors and antenna. Finally, in the manner which has been described, the antenna is securely stabilized in both its extended and its stored dispositions.

Obviously many modifications and variations of the present invention are possible in the light of the above teachings. It is therefore to be understood that within the scope of the appended claims the invention may be practiced otherwise than as specifically described.

We claim:

1. Apparatus for opening and closing a door member and for synchronously extending and retracting a deployable object normally carried in a door-enclosed storage area of a support structure comprising:
   an elongate drive shaft,
   means for rotatably driving said shaft in opposite directions,
   a crank shaft carried by said shaft, a first and second pair of lever arms rigidly carried by and having different lengths extending radially outwardly of said crank shaft for pivotal movement therewith, separate and independent first and second linkage systems, a first means pivotally coupling said first linkage system to the outer end of said first lever arm, and a second means pivotally coupling said second linkage system to the outer end of said second lever arm, said first linkage system engaging said door member for swingably opening and closing it responsively to said bi-directional rotational movements of said drive shaft and said second linkage system engaging said normally stored object for swingably extending and retracting it responsively to said same bi-directional rotational movements, said first and second coupling means each being pivotally driven by said crank shaft into an overcenter disposition when rotated in one direction but not the other; said first coupling means moving said first linkage system to an overcenter disposition when the door member is opened and the second coupling means to an overcenter disposition when the object is retracted, said overcenter disposition of the second linkage system delaying any extension movement of the object until said door member is partially open and the overcenter disposition of the first linkage system delaying any closing movement of the door member until the object is partially retracted.

2. The apparatus of claim 1 wherein said second lever arm is of a substantially greater length than the first lever arm whereby said second lever arm is provided with a substantially greater pivotal radius than the first.

3. The apparatus of claim 1 further including:

first abutment means carried in a fixed position by said support structure for physically engaging said deployable object in its extended disposition, and a second abutment means fixedly carried by said support structure for engaging said second lever arm when said second linkage system is moved into its overcenter disposition, and means for locking said drive shaft in predetermined rotated positions whereby said object can be moved into engagement with either of said abutment means and said engagements firmly maintained by said locking of said shaft.

4. The apparatus of claim 1 wherein:

when said object is in its retracted position, said overcenter disposition of said second linkage system produces an initial retraction movement of the object concurrently with the initial opening movement of said doors, and when said object is in its extended position, said overcenter disposition of said first linkage system produces an initial movement of the door member in an opening direction concurrently with the initial retraction movement of said object, said overcenter dispositions being adjusted to assure that said initial movements avoid physical interference between the opening and closing movement of said door member and the extension and retraction movements of said deployable object.

5. The apparatus of claim 4 wherein said door member is of a clam-shell type formed of a pair of half-door members and wherein a substantially identical pair of said first linkage systems are employed, each of said first linkage systems being pivotally coupled to a separate one of said half-door members and said systems being engaged with said half-door members in such a manner that said members are swung upon on parallel rotational axes laterally one away from the other into said storage and swung closed in reverse manner, said apparatus further including:

a pair of said crank shafts spaced longitudinally on said drive shaft, each of said crank shafts having said first and second lever arms with the first lever arm of each being pivotally coupled to one of said pair of first linkage systems.

6. The apparatus of claim 5 wherein said second lever arm of each crank shaft is pivotally coupled to a separate second linkage system, said separate second linkage systems each swingably engaging said deployable object.

7. The apparatus of claim 6 wherein said second linkage systems are engaged with said object in such a manner that said object is swung on a rotational axis extending at an angle to said parallel rotational axes of said half-door members.

8. The apparatus of claim 7 wherein said support structure is an aircraft having a bay portion enclosed by said clam-shell type door member and said deployable object is a relatively large antenna stored in said bay portion, said second linkage systems being arranged to swingably extend and retract said antenna in a downward and upward arc having a rotational axis extending transversely of the aircraft and said first linkage system being arranged to swingably open said door member in an arc having a rotational axis extending substantially lengthwise of said aircraft.

9. The apparatus of claim 8 wherein said antenna is a semi-circular object of such a size as to occupy substantially all of said bay portion when retracted.

* * * * *